(12) United States Patent
Wong

(10) Patent No.: US 7,934,711 B2
(45) Date of Patent: May 3, 2011

(54) ANGLE BRACKET

(76) Inventor: Harry Wong, South Pasadena, CA (US)

( * ) Notice: Subject to any disclaimer, the term of this patent is extended or adjusted under 35 U.S.C. 154(b) by 416 days.

(21) Appl. No.: 12/323,911

(22) Filed: Nov. 26, 2008

(65) Prior Publication Data

US 2009/0072462 A1    Mar. 19, 2009

Related U.S. Application Data

(62) Division of application No. 11/545,858, filed on Oct. 10, 2006, now abandoned.

(60) Provisional application No. 60/725,343, filed on Oct. 10, 2005.

(51) Int. Cl.
*B25B 1/20*        (2006.01)
(52) U.S. Cl. .................. 269/45; 269/3; 269/6; 269/95; 29/270
(58) Field of Classification Search ............ 269/45, 269/3, 6, 95, 143, 249, 271; 29/270, 255, 29/244, 257; 248/226.11
See application file for complete search history.

(56) References Cited

U.S. PATENT DOCUMENTS

| | | | | |
|---|---|---|---|---|
| 979,305 | A * | 12/1910 | Hunt | 269/9 |
| 2,606,583 | A * | 8/1952 | O'Connor | 269/93 |
| 3,824,744 | A * | 7/1974 | Petrant | 451/387 |
| 4,141,542 | A * | 2/1979 | Wolff | 269/88 |
| 5,494,553 | A * | 2/1996 | Colucci | 156/580 |
| 5,547,305 | A * | 8/1996 | Treche | 403/97 |
| 5,785,305 | A * | 7/1998 | Stalker | 269/37 |
| 5,971,379 | A * | 10/1999 | Leon, Jr. | 269/8 |
| 2007/0241250 | A1* | 10/2007 | Wong | 248/226.11 |
| 2009/0072462 | A1* | 3/2009 | Wong | 269/45 |

\* cited by examiner

*Primary Examiner* — Lee D Wilson
(74) *Attorney, Agent, or Firm* — Jen-Feng Lee, Esq.

(57) ABSTRACT

An angle bracket formed of a block of material. It has an elongated upper arm member formed adjacent the top end of a connecting member and an elongated lower arm member connected to the bottom end of the connecting member. The rear surface of the respective arm members make a 90 degree angle with each other. The top surface of the respective arm members have a swivel pad recess and a plurality of locking channels extend radially outwardly therefrom for receiving the arm of a clamp. An alternative embodiment angle bracket is capable of adjustable angles. It has an L-shaped upper clamp arm that is pivotally connected to an L-shaped lower clamp arm. Each of these arms have a V-shaped support clamp portion formed at their free end.

7 Claims, 9 Drawing Sheets

ANGLE BRACKET

STATEMENT OF RELATED APPLICATION

This is a DIVISIONAL application of a previously-filed parent application Ser. No. 11/545,858, having original filing date of Oct. 10, 2006 now abandoned, which claims the priority of U.S. Provisional Patent Application Ser. No. 60/725,343, filed Oct. 10, 2005.

This divisional application claims the non-elected (second) species, as traversed, in the response to Office Action dated Jul. 29, 2008 for application Ser. No. 11/545,858.

FIELD AND BACKGROUND OF THE INVENTION

The invention relates to clamps that are used to hold different parts together after they have been glued together or prior to being welded or soldered together. More specifically the invention relates to an angle clamp that can be used with C-clamps, sliding arm clamps, locking pliers and other locking devices.

In assembling panels, boards, pipes, etc. it is important that the respective parts be oriented properly together. This is especially true where these parts are held together by adhesives or by soldering or welding. One of the most commonly used types of clamps are C-clamps. Another is the sliding arm clamp. Locking pliers and vice grips are also used. There has been a need for a unique angle bracket that can be used with the above mentioned clamps and locking devices and one that can be used with an array of attachments that make the assembly process easier.

It is an object of the invention to provide a novel angle bracket that is multi-functional in its ability to serve more than one application.

It is also an object of the invention to provide a novel angle bracket that allows for a minimum time for set-up.

It is another object of the invention to provide a novel angle bracket that is compatible with interchangeable accessories.

It is an additional object of the invention to provide a novel angle bracket that is economical to manufacture and market.

OBJECTS AND SUMMARY OF THE INVENTION

The novel angle bracket is made of a block of material that may be plastic, metal or any other suitable material. It has an elongated upper arm member, an elongated lower arm member and a connecting member. The rear surface of the respective upper arm member and lower arm member are oriented at 90 degrees to each other. The front surface of the respective upper arm member and lower arm member each have a generally circular recess with a central aperture that passes all of the way through to the rear surface of their respective arm members. A plurality of locking channels radiate outwardly to the edges of the respective arm members from the circular recess.

When used with C-clamps and vice pliers, the swivel pad of these respective tools would be positioned in the circular recess and the arms of these tools would drop into the locking channels thereby preventing rotation of the clamping tool. The rear surfaces of the respective upper and lower arm members has a longitudinally extending V-shaped groove that allows circular tubes or pipes to be clamped to the rear surface of the angle bracket. One of the side edges of the angle bracket has an ear member extending laterally from each of the upper arm member and the lower arm member. A pin is mounted in the bottom surface of the ear members and these pins act to alignment the side edges of parts that are being clamped together. These pins may be spring loaded, or solid rods, and they be removable when not being used.

An alternative embodiment angle bracket has been designed for use when assembling pipes that will interconnect to each other at angles by use of an elbow pipe. This angle bracket has an L-shaped upper clamp arm that is pivotally connected to an L-shaped lower clamp arm. These clamp arms rotate about a pivot pin that can be tightened to lock their orientation at any predetermined angle. A V-shaped support clamp portion is formed on the free end of each of the respective L-shaped upper and lower clamp arms. These V-shaped support clamp portions provide a support structure for the individual pipes that are being connected together. A tab extends laterally from a support wing member of each of the V-shaped clamp portions. This tab has an aperture that allows the rod of a sliding arm clamp to be adjusted longitudinally there within. An adjustable arm is also slidably mounted on the rod member and its one end has a swivel pad mounted on a threaded bolt that is used to clamp a pipe member rigidly into the V-shaped support clamp portion.

DETAILED DESCRIPTION OF THE PREFERRED EMBODIMENT

Figure 1:
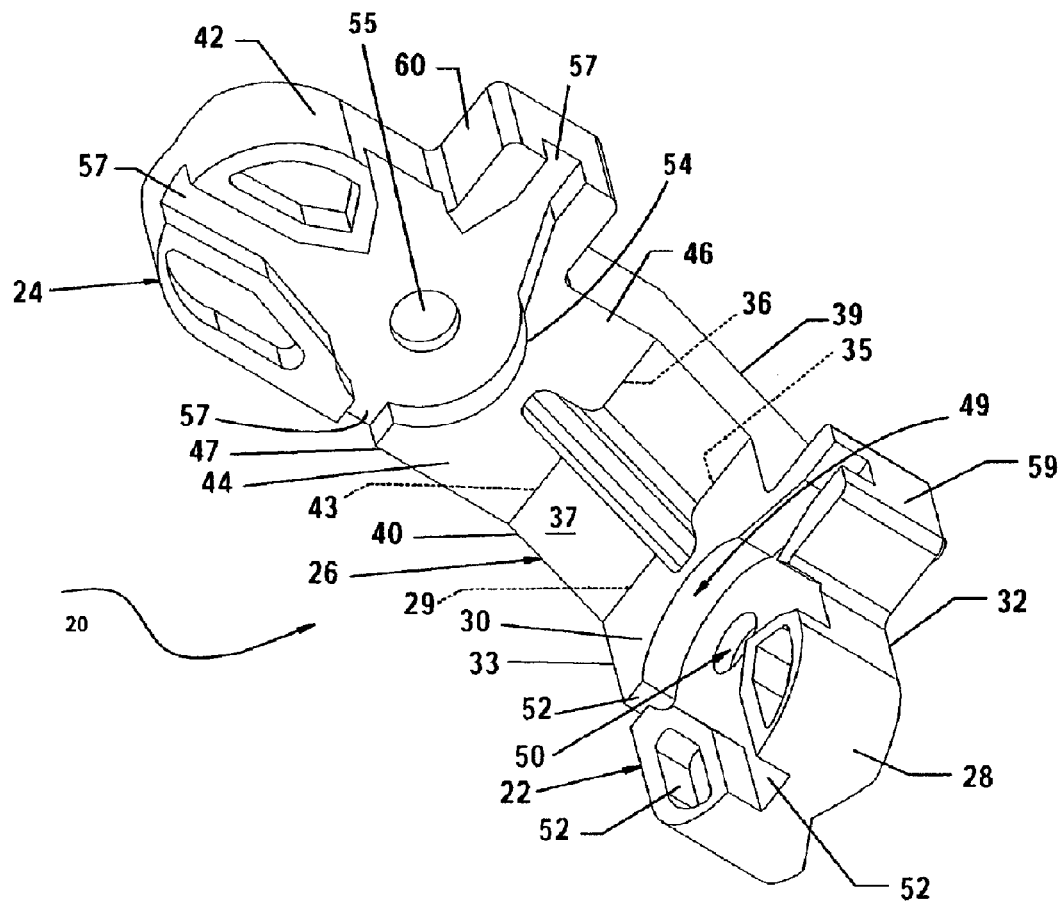
FIG. 1 is a front perspective view of the angle bracket.
Figure 2:
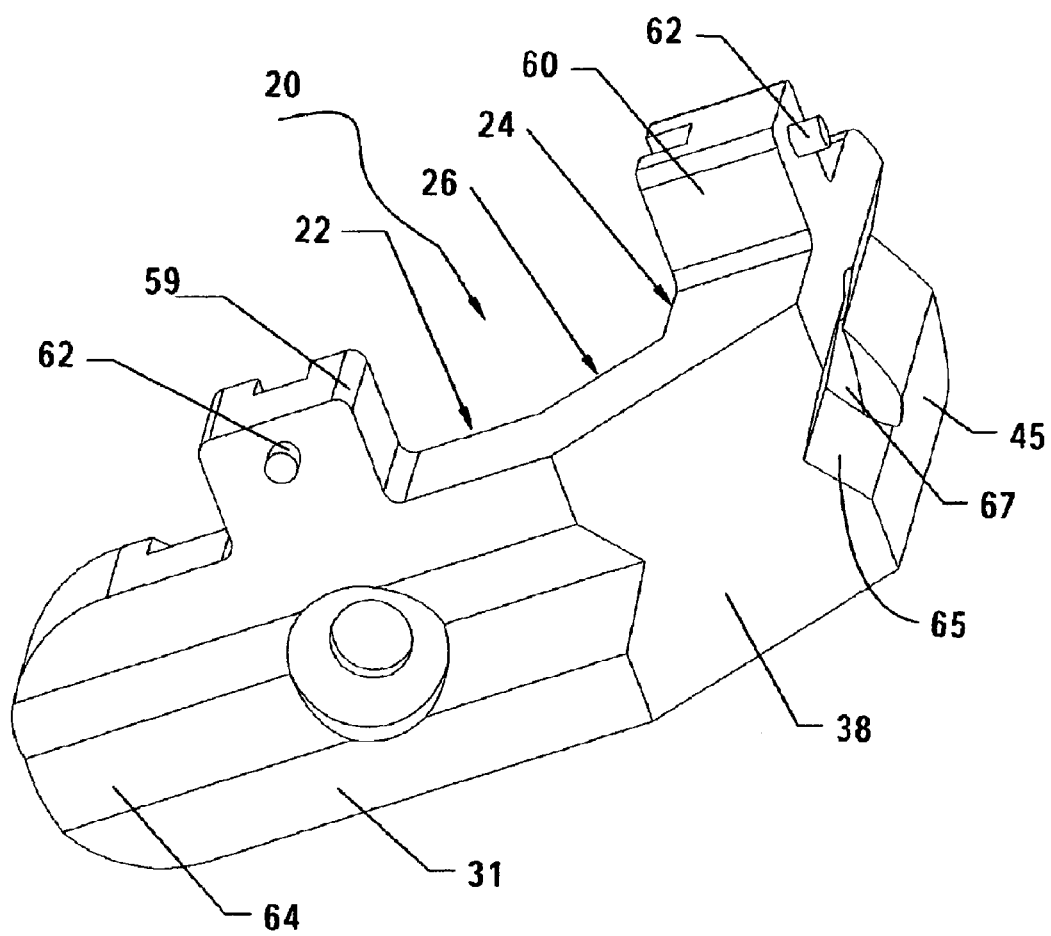
FIG. 2 is a bottom perspective of the angle bracket.

The angle bracket is generally designated numeral 20 and will be described by referring to FIGS. 1 and 2 of the drawings. The angle bracket 20 is preferably made from a block of material such as plastic, metal or any other appropriate material. FIG. 1 is a front perspective view of the angle bracket and FIG. 2 is a bottom perspective view. Angle bracket 20 has an elongated upper arm member 22, an elongated lower arm member 24 and a connecting member 26.

Elongated upper arm member 22 has a top end 28, a bottom end 29, a front surface 30, a rear surface 31, a left side edge 32 and a right side edge 33. Connecting member 26 has an upper end 35, a lower end 36, a top surface 37, a bottom surface 38, a left side edge 39 and a right side edge 40. Upper end 35 of connecting member 26 is connected to bottom end 29 of elongated upper arm member 22 at an obtuse angle A.

Elongated lower arm member 24 has a front end 42 a rear end 43, a top surface 44, a bottom surface 45, a left side edge 46 and a right side edge 47. Rear end 43 of elongated lower arm member 24 is connected to lower end 36 of connecting member 26 at an obtuse angle B.

A first swivel pad receptacle or recess 49 is formed on the front surface 30 of elongated upper arm member 22. An aperture 50 is located in the center of recess 49 and it passes all of the way through to the rear surface 31 of elongated upper arm member 22. A plurality of locking channels 52 radiate outwardly from the generally circular recess 49. Their purpose will be discussed later. A similar recess or swivel pad receptacle 54 is formed in the top surface 44 of elongated lower arm member 24. An aperture 55 passes downwardly entirely through the lower arm member 24. A plurality of locking channels 57 radiate from recess 54.

The bottom surface 31 of upper arm member 22 is oriented at 90 degrees to the bottom surface 45 of lower arm member 24. An ear member 59 extends outwardly from the left side edge 32 of upper arm member 22. An ear member 60 extends outwardly from left side edge 46 of lower arm member 24. An alignment pin 62 extends rearwardly from the respective ear members 60. Alignment pins 62 may be spring loaded or solid pins and they may also be removable when not in use. A V-shaped groove 64 extends along the rear surface of upper arm member 22 and a V-shaped groove 65 extends along the rear surface of elongated lower arm member 24. Each of the grooves has a counter sunk recess 67 that aligns with the respective apertures 50 and 55. Bottom surfaces 31 and 45 are substantially planar except for their respective V-shaped grooves.

Figure 3:
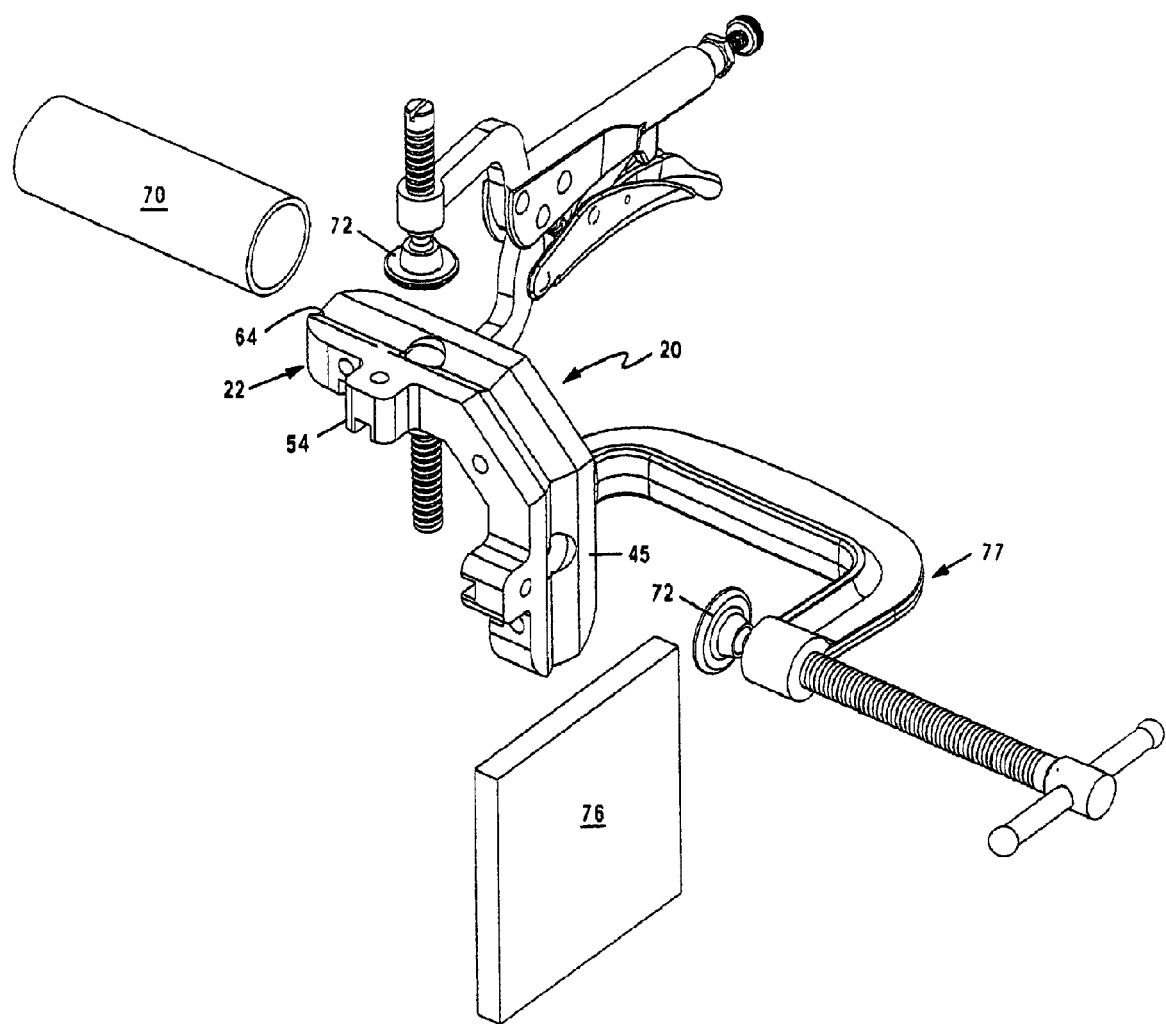
FIG. 3 is an exploded rear perspective view illustrating a locking plier that will be used to secure a pipe to the top of the angle bracket and a C-clamp that will be used to secure a plate to the rear of the angle bracket.
Figure 4:
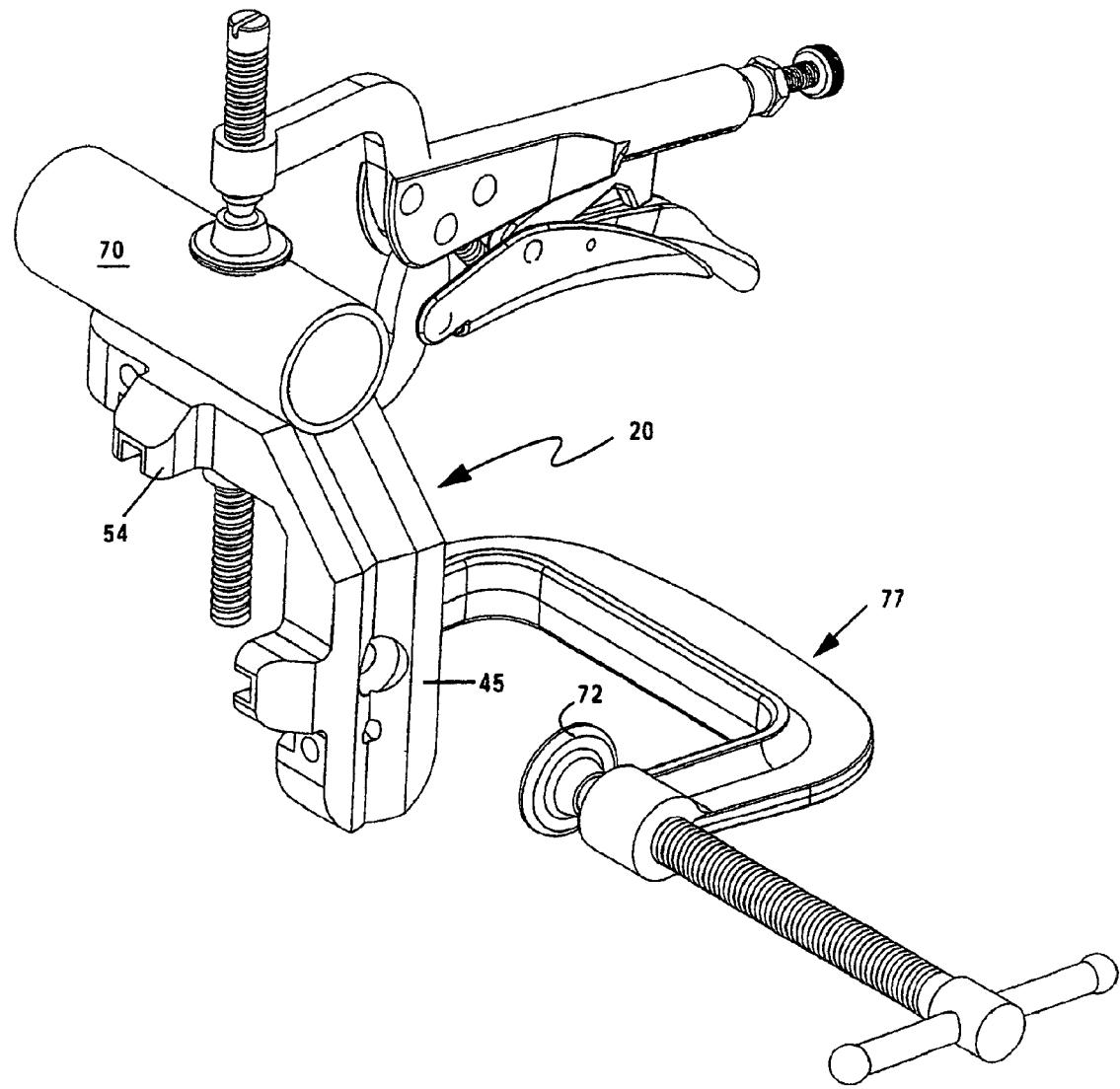
FIG. 4 is a rear perspective view showing the locking plier securing the pipe to the top of the angle bracket.

FIGS. 3 and 4 show the manner in which a pipe 70 is clamped to a V-shaped groove 64 of angle bracket 20. A locking plier 74 has a swivel pad 72 that locks pipe 70 in its proper position. A plate 76 is positioned against bottom surface 45 and the swivel pad 72 on D-clamp 77 will hold it in its proper position.

Figure 6:
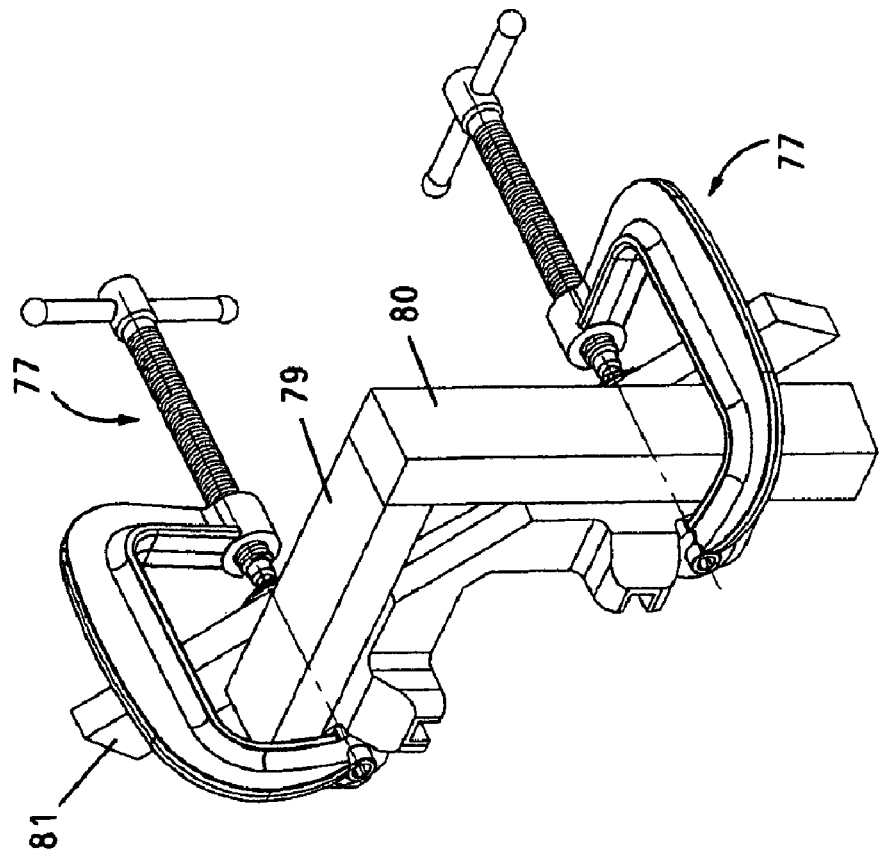
FIG. 6 is a rear perspective illustrating the manner in which a pair of boards are secured at a 90 degree angle to each other and held in place by a pair of C-clamps.
Figure 5:
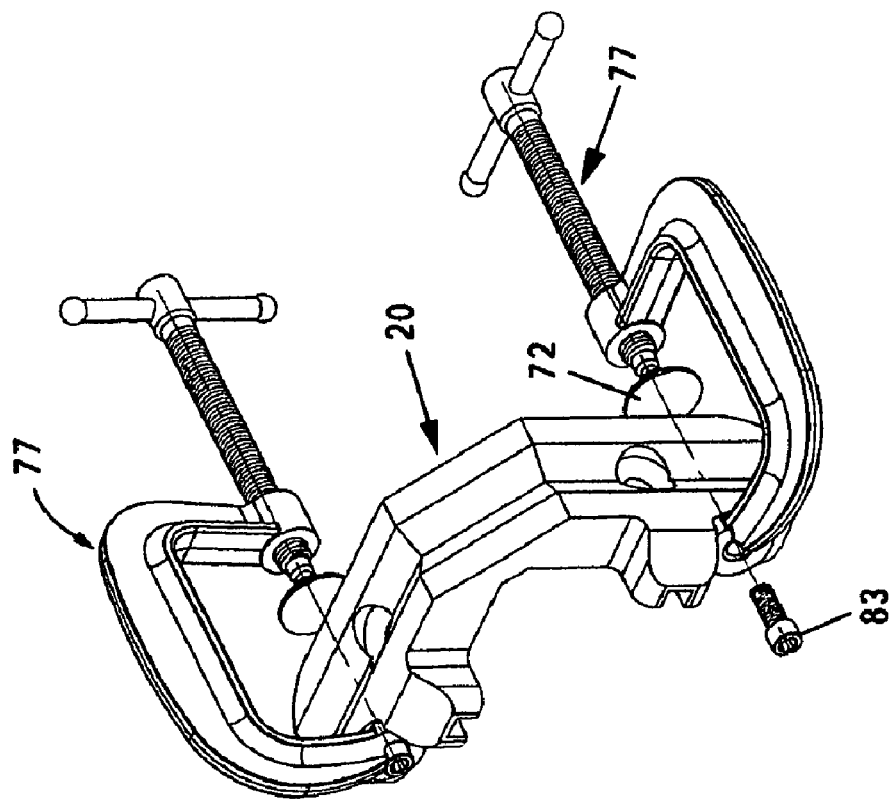
FIG. 5 is a rear perspective view showing the manner in which a pair of C-clamps would be secured to the angle bracket.
Figure 7:
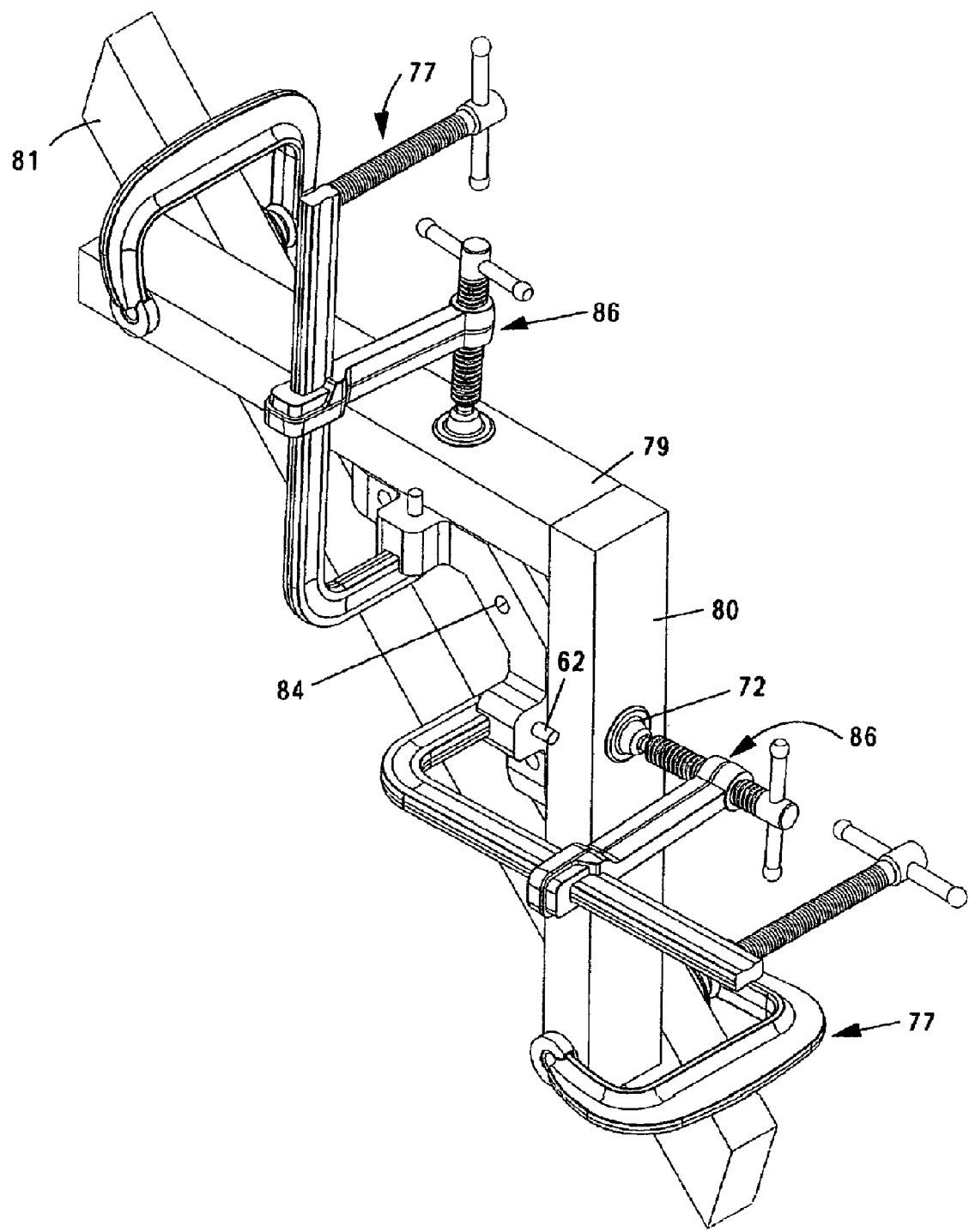
FIG. 7 is a rear perspective view illustrating the manner in which a pair of boards are secured at 90 degrees to each other and held in place by a pair of sliding arm clamps and a pair of C-clamps.

In FIGS. 5 and 6, C-clamps 77 are used to align boards 79 and 80 at 90 degrees to each other. A board 81 is used to align the right edges of these boards. Bolts 83 screw into threaded apertures in the side of angle bracket 20. The swivel pads 72 are forced against the opposite side of board 80. In FIG. 7, two C-clamps 77 and two sliding arm clamps 86 are used to properly align boards 79 and 80. Pins 62 insure that the left edge of these boards are in the same plane.

Figure 8:
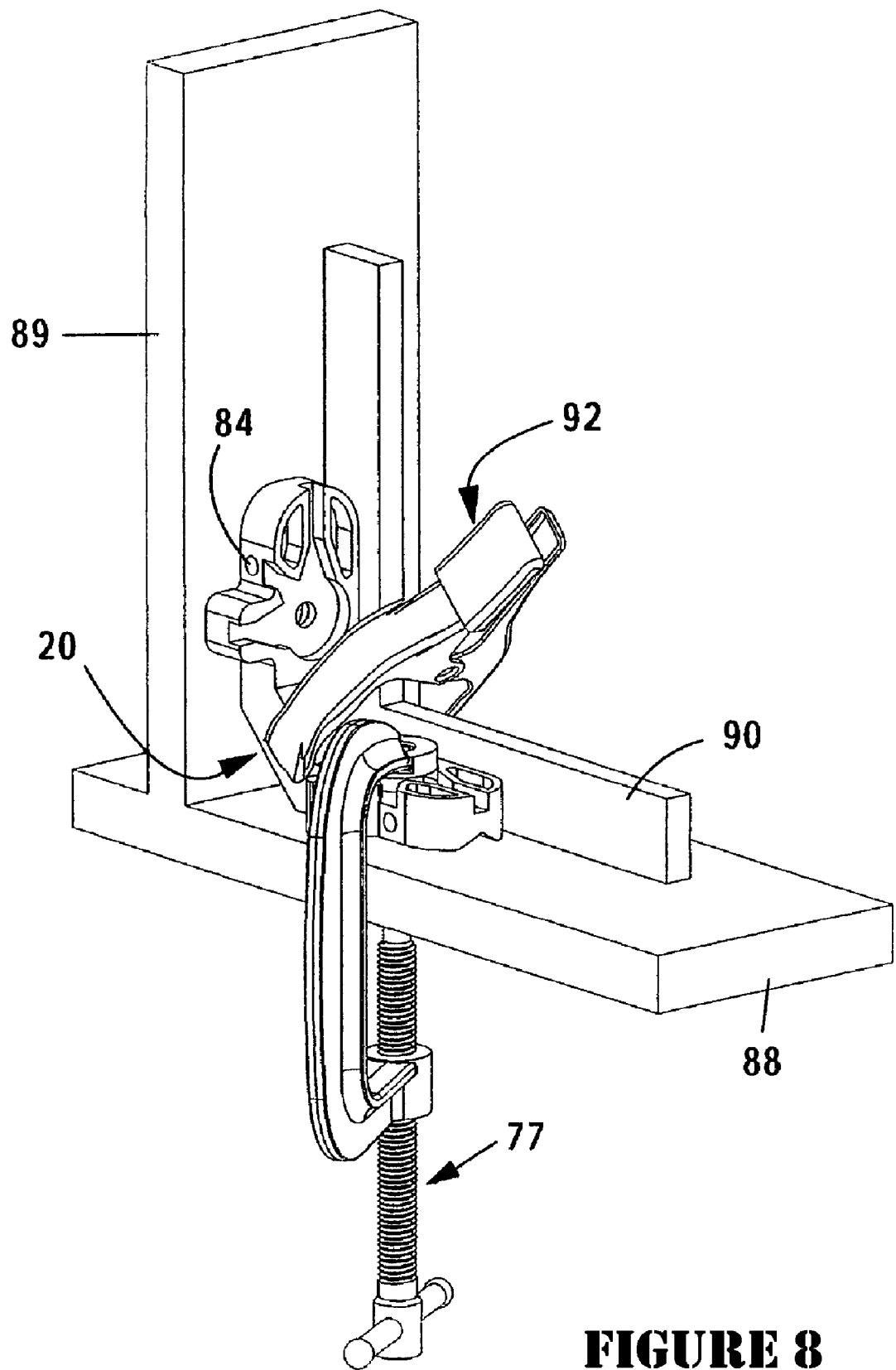
FIG. 8 is front perspective view showing a C-clamp holding the angle bracket to the top surface of a board and a ruler clamped to the side of the angle bracket.

In FIG. 8 boards 88 and 89 are aligned at 90 degrees to each other by angle bracket 20 and square 90. A clamp 92 holds angle bracket 20 and square 90 together. A C-clamp 77 holds angle bracket 20 securely to board 88.

Figure 9:
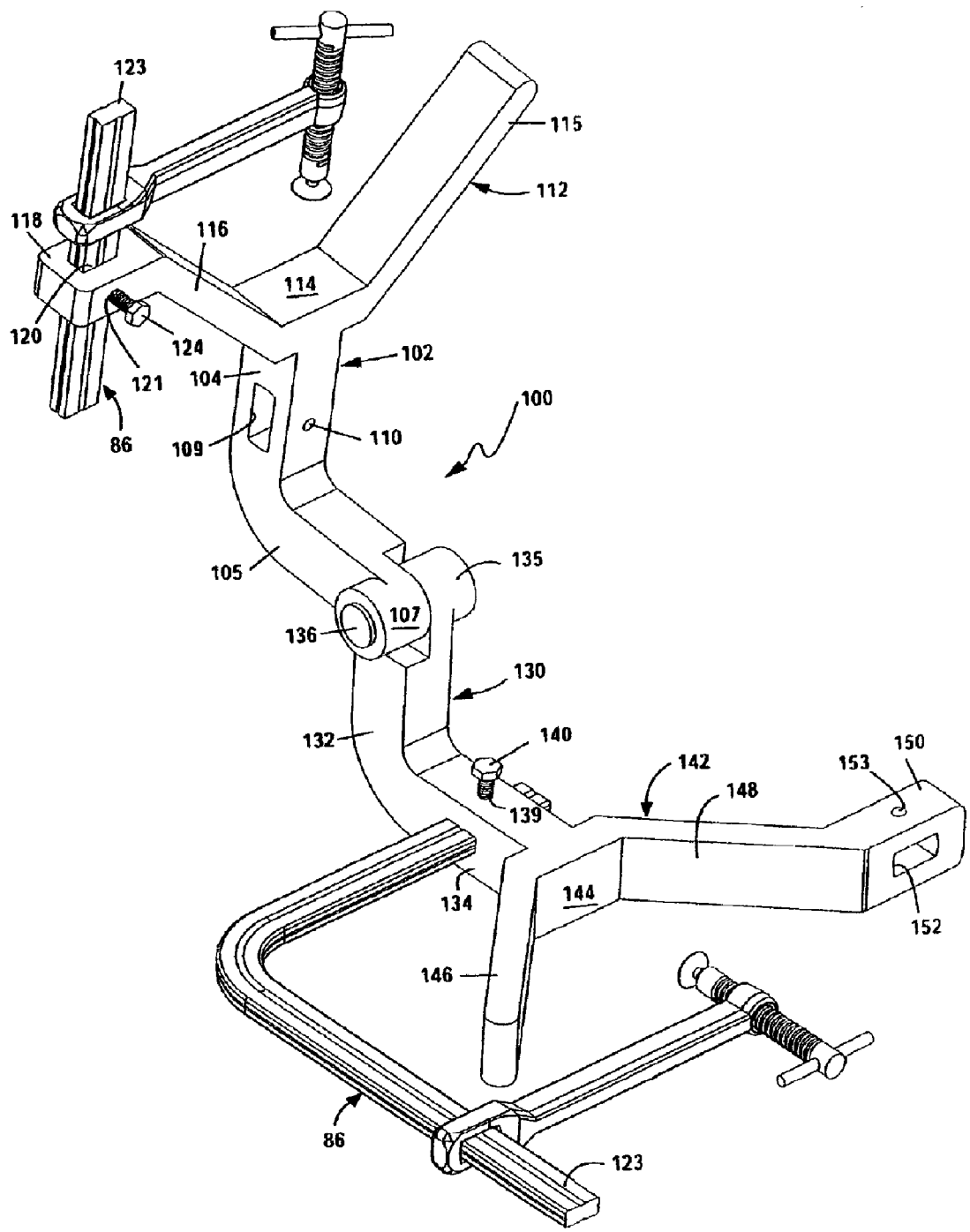
FIG. 9 is a front perspective view of a first alternative angle bracket.
Figure 10:
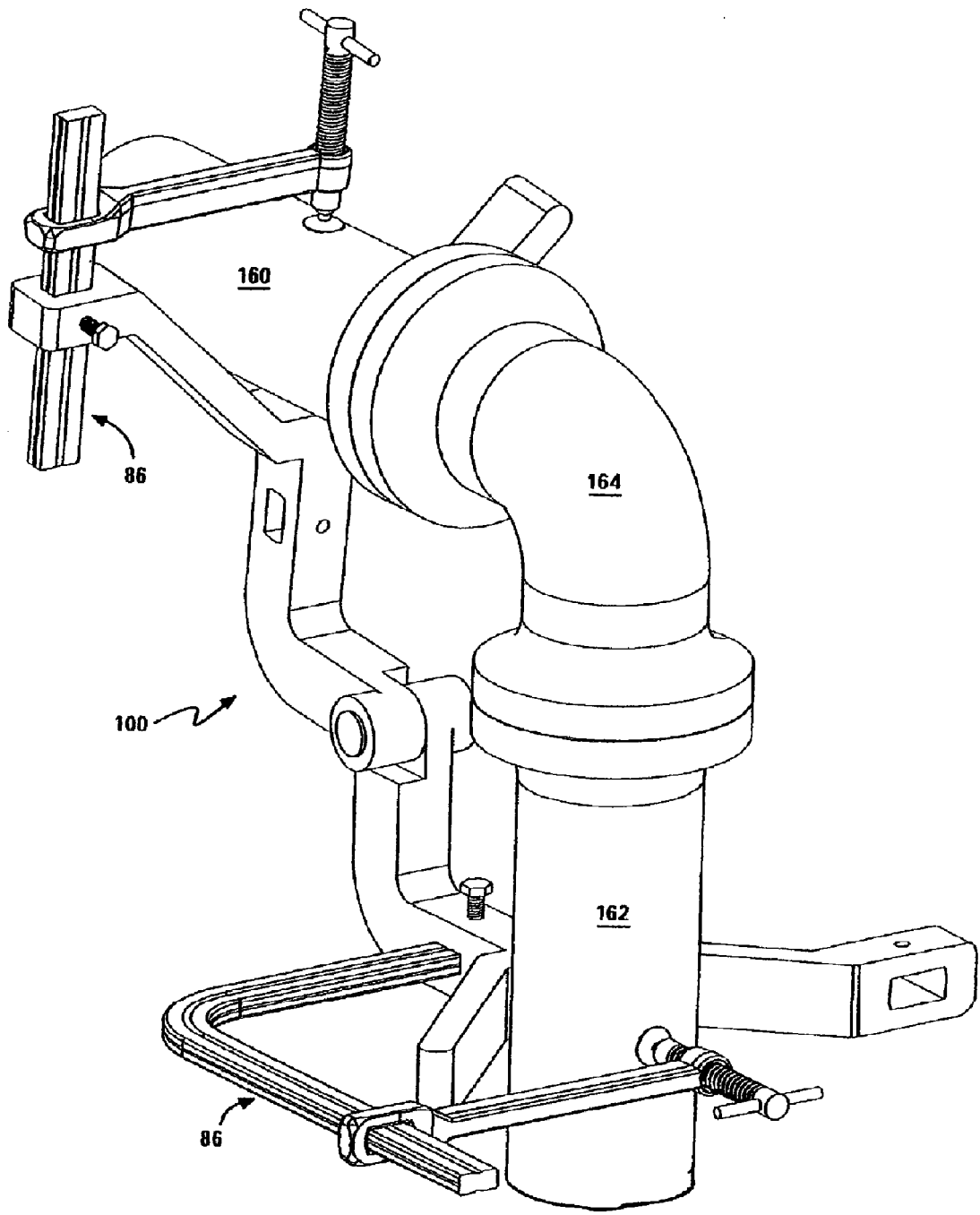
FIG. 10 is a front perspective illustrating the manner in which a pair of pipes are connected to an elbow pipe between them and held in position by a pair of sliding arm clamps.

An alternative embodiment angle bracket 100 is illustrated in FIGS. 9 and 10. It has an L-shaped upper clamp arm 102 having an upper leg portion 104 and a lower leg portion 105. A first cylindrical tubular head 107 is formed on the front end of lower leg portion 105. A rectangular aperture 109 and a threaded bore 110 are also formed in upper leg portion 104. A V-shaped support clamp portion 112 is formed on the top end of upper leg portion 104. It has a cross member 114, a right side support wing member 115 and a left side support wing member 116. A tab 118 extends laterally from the top end of left side support wing 116 and it has an aperture 120 and a threaded bore hole 121. Sliding arm clamp 86 has a rectangular rod 123 that passes through aperture 120 and it is held in position by set screw 124.

Angle bracket 100 also has an L-shaped lower clamp arm 130 having an upper leg portion 132 and a lower leg portion 134. A first cylindrical tubular head 135 is formed adjacent the top end of upper leg portion 132. A pivot pin 136 allows the respective L-shaped lower claim arm 130 and L-shaped upper clamp arm member 102 to be angularly adjusted and locked at any desired angle. Lower leg portion 134 has a aperture 138 and a threaded bore 139 that receives set screw 140. A V-shaped support clamp portion 142 is formed on the front end of lower leg portion 134. It has a cross member 144, a left side support wing member 146 and a right side support wing member 148. A tab 150 extends laterally from right side support wing member 148 and it has a rectangular aperture 152 and a threaded aperture 153. FIG. 10 shows the manner in which sliding arm clamps 86 hold the pipes 160 and 162 in proper orientation to elbow pipe 164.

Although this invention has been described in connection with specific forms and embodiments thereof it will be appreciated that various modifications other than those discussed above may be resorted to without departing from the spirit or scope of the invention. For example, equivalent elements may be substituted for those specifically shown and described, certain features may be used independently of other features, and the number and configuration of various components described above may be altered, all without departing from the spirit or scope of the invention as defined in the appended Claims.

What is claimed is:

1. An angle bracket for properly aligning structural members that will be rigidly connected to each other comprising:
   an L-shaped upper clamp arm having an upper leg portion oriented 90 degrees to a lower leg portion; said lower leg portion having a front end having a first cylindrical head; said upper leg portion having a top end having a V-shaped support clamp portion formed thereon;
   an L-shaped lower arm having an upper leg portion oriented 90 degrees to a lower leg portion; said lower leg portion having a front end having a V-shaped clamp portion formed thereon; said upper leg portion having a top end having a second cylindrical tubular head; and
   pivot means for pivotally securing said first and second tubular heads together so that L-shaped upper clamp arm and L-shaped lower clamp arm can be pivoted to respect to each other.

2. An angle bracket as recited in claim 1 further comprising means in said lower leg portion of said L-shaped lower clamp arm for adjustably seating and locking thereto a leg member of a sliding arm clamp.

3. An angle bracket as recited in claim 2 wherein V-shaped support clamp portion of said L-shaped lower clamp arm comprises a cross member having a left end and a right end; a left side support wing extends upwardly from said left end; a right side support wing member extends upwardly from said right end.

4. An angle bracket as recited in claim 3 wherein said right side support wing member has an outer end with a tab extending laterally therefrom; said tab having means for adjustably receiving and locking thereto a leg member of a sliding arm clamp.

5. An angle bracket as recited in claim 1 further comprising means in said upper leg portion of said L-shaped upper clamp arm for adjustably receiving and locking thereto a leg member of a sliding arm clamp.

6. An angle bracket as recited in claim 5 wherein said V-shaped support clamp portion of said L-shaped upper clamp arm comprises a cross member having a left end and a right end; a left side support wing extends upwardly from said left end; a right side support wing member extends upwardly from said right end.

7. An angle bracket as recited in claim 6 wherein said left side support wing member has an outer end with a tab extending laterally therefrom; said tab having means for adjustably receiving and locking thereto a leg member of a sliding arm clamp.

* * * * *